(12) United States Patent
Begin et al.

(10) Patent No.: US 9,003,793 B2
(45) Date of Patent: Apr. 14, 2015

(54) TURBOCHARGER ASSEMBLY WITH COMPRESSED AIR COOLED BEARINGS

(71) Applicant: GM Global Technology Operations LLC, Detroit, MI (US)

(72) Inventors: Louis Begin, Rochester, MI (US); Brian J. Edwards, Macomb, MI (US); Carnell E. Williams, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 13/906,999

(22) Filed: May 31, 2013

(65) Prior Publication Data

US 2014/0352299 A1 Dec. 4, 2014

(51) Int. Cl.
| F02B 33/44 | (2006.01) |
| F01D 25/08 | (2006.01) |
| F01D 25/12 | (2006.01) |
| F04D 29/58 | (2006.01) |
| F04D 29/04 | (2006.01) |
| F02B 47/08 | (2006.01) |

(52) U.S. Cl.
CPC ...................... F02B 47/08 (2013.01)

(58) Field of Classification Search
USPC ................. 60/605.3; 415/177, 178, 180, 229
See application file for complete search history.

(56) References Cited

U.S. PATENT DOCUMENTS

| 5,087,176 | A | * | 2/1992 | Wieland .................. 415/177 |
| 5,113,670 | A | * | 5/1992 | McAuliffe et al. ........... 417/406 |
| 5,248,245 | A | * | 9/1993 | Behnke et al. ................ 417/366 |
| 6,050,095 | A | | 4/2000 | Blake |
| 7,108,488 | B2 | | 9/2006 | Larue et al. |
| 7,112,036 | B2 | | 9/2006 | Lubell et al. |
| 7,360,361 | B2 | * | 4/2008 | Prusinski et al. ............... 60/608 |
| 7,988,426 | B2 | | 8/2011 | Elpern et al. |
| 2010/0111725 | A1 | * | 5/2010 | Knoop .......................... 415/180 |
| 2011/0255963 | A1 | * | 10/2011 | Kim .............................. 415/229 |
| 2012/0017879 | A1 | * | 1/2012 | Wu .............................. 60/605.2 |

* cited by examiner

Primary Examiner — Mary A Davis
(74) Attorney, Agent, or Firm — Quinn Law Group, PLLC

(57) ABSTRACT

A turbocharger assembly includes a compressor assembly, a turbine wheel, a shaft, a bearing assembly, and a cooling gas conduit. The compressor assembly includes a compressor impeller. The compressor impeller includes an outermost impeller edge and has a maximum cross-sectional dimension at the outermost impeller edge. The shaft interconnects the compressor impeller and the turbine wheel. The bearing assembly surrounds at least a portion of the shaft. The cooling gas conduit is disposed in fluid communication with the compressor assembly and the bearing assembly. At least a portion of the cooling gas conduit is disposed adjacent the outermost impeller edge such that the cooling gas conduit is configured to receive a portion of intake gases flowing along the outermost impeller edge and guide the portion of the intake gases toward the bearing assembly to cool the bearing assembly.

14 Claims, 2 Drawing Sheets

TURBOCHARGER ASSEMBLY WITH COMPRESSED AIR COOLED BEARINGS

TECHNICAL FIELD

The present disclosure relates to turbocharger assemblies including a bearing cooling system.

BACKGROUND

Internal combustion engines may use an exhaust driven compressor or turbocharger assembly to increase the manifold air pressure (MAP), thereby providing increased engine performance for a given engine displacement. A typical turbocharger assembly includes a turbine assembly in fluid communication with the exhaust gases and a compressor assembly in fluid communication with the intake gases. A portion of the energy contained within the exhaust gases operates to spin or rotate a turbine wheel disposed within the turbine assembly. The turbine wheel is connected to a compressor impeller of the compressor assembly through a common shaft. As such, the turbine wheel and compressor impeller rotate in unison. In operation, as the exhaust gases rotate the turbine wheel, the rotating compressor impeller inducts or draws intake gases into the compressor assembly where the intake gases are pressurized for subsequent introduction to the internal combustion engine.

A conventional turbocharger assembly may also include a bearing assembly to support the load of the shaft interconnecting the turbine wheel and the compressor impeller. In some turbocharger assemblies, a gas or air bearing assembly supports the load of the shaft. Air bearing assemblies employ a thin film of gas (such as air) that acts as the lubricant, separating two surfaces in relative motion. In operation, a gas film flows between the air bearing and the shaft of the turbocharger assembly to protect the shaft and the air bearing assembly itself from wear.

SUMMARY

The present disclosure relates to, among other things, turbocharger assemblies. In one embodiment, the turbocharger assembly includes a compressor assembly, a turbine wheel, a shaft, a bearing assembly, and a cooling gas conduit. The compressor assembly includes a compressor impeller. The compressor impeller includes an outermost impeller edge and has a maximum cross-sectional dimension at the outermost impeller edge. The shaft interconnects the compressor impeller and the turbine wheel. The bearing assembly surrounds at least a portion of the shaft. The cooling gas conduit is disposed in fluid communication with the compressor assembly and the bearing assembly. At least a portion of the cooling gas conduit is disposed adjacent the outermost impeller edge such that the cooling gas conduit is configured to receive a portion of intake gases flowing along the outermost impeller edge and guide the portion of the intake gases toward the bearing assembly to cool the bearing assembly.

In one aspect of the present disclosure, the cooling gas conduit may include a first end portion and a second end portion. The first end portion may be disposed adjacent the outermost impeller edge to facilitate entry of the portion of the intake gases into the cooling gas conduit. The first end portion of the cooling gas conduit may include a curved section configured and shaped to facilitate entry of the portion of the intake gases into the cooling gas conduit. At least part of the first end portion may overlap the outermost impeller edge.

In one aspect of the present disclosure, the compressor impeller may define a first impeller end and a second impeller end. The first end portion of the cooling gas conduit may be disposed adjacent the second impeller end such that a portion of the intake gases can flow into the cooling gas conduit.

In one aspect of the present disclosure, the turbocharger assembly may further include a compressor backplate disposed adjacent the compressor impeller. The cooling gas conduit may be configured as a cooling gas opening extending through the compressor backplate.

In one aspect of the present disclosure, the shaft may be configured to rotate about a rotation axis. The cooling gas opening may be elongated along an opening axis, and the opening axis may be obliquely angled in relation to the rotation axis.

The turbocharger may further include a center housing coupled between the compressor assembly and the turbine wheel. The compressor backplate may be monolithically formed with the center housing. The second end portion of the cooling gas conduit may be disposed within the center housing.

In one aspect of the present disclosure, the second end portion of the cooling gas conduit may be disposed adjacent the bearing assembly. As such, the cooling gas conduit may be configured to direct a portion of the intake gases into the bearing assembly.

The present disclosure also relates to vehicles such as cars. In one embodiment, the vehicle includes a turbocharger assembly and an engine including an intake manifold and an exhaust manifold. The turbocharger assembly includes a compressor assembly disposed in fluid communication with the intake manifold. The compressor assembly includes a compressor impeller defining a first impeller end and a second impeller end. The turbocharger assembly further includes a turbine assembly disposed in fluid communication with the exhaust manifold. The turbine assembly includes a turbine wheel disposed closer to the second impeller end than to the first impeller end. The turbocharger assembly further includes a shaft interconnecting the compressor impeller and the turbine wheel and an air foil bearing assembly surrounding at least a portion of the shaft. Moreover, the turbocharger assembly includes a compressor backplate substantially covering the second impeller end. The compressor backplate defines a plurality of cooling gas openings. Each cooling gas opening extends through the compressor backplate and is disposed in fluid communication with the compressor assembly and the air foil bearing assembly. Further, each cooling gas opening is configured and shaped to receive a portion of intake gases flowing along the compressor impeller and direct such portion of the intake gases toward the air foil bearing assembly to cool the air foil bearing assembly.

In one aspect of the present disclosure, the compressor impeller includes an outermost impeller edge and has a maximum cross-sectional dimension at the outermost impeller edge. At least part of each cooling gas opening is disposed adjacent the outermost impeller edge.

In one aspect of the present disclosure, the compressor backplate may include a plurality of inner backplate surfaces. Each inner backplate surface may define at least one cooling gas opening. Each inner backplate surface includes a curved section disposed adjacent the outermost impeller edge. Each curved section is configured and shaped to allow a portion of the intake gases to enter each cooling gas opening. At least part of the curved section may overlap the outermost impeller edge.

In one aspect of the present disclosure, at least one of the cooling gas openings is elongated along an opening axis. The shaft may be configured to rotate about a rotation axis, and the opening axis is obliquely angled in relation to the rotation axis.

In one aspect of the present disclosure, the vehicle may further include a center housing coupled between the compressor assembly and the turbine assembly. The compressor backplate may be monolithically formed with the center housing. At least one of the cooling gas openings may be substantially cylindrical.

The present disclosure also relates to methods of cooling an air foil bearing assembly. In one embodiment, the method includes a compressing intake gases using a compressor assembly. The compressor assembly includes a compressor housing, a compressor impeller located within the compressor housing, and a compressor backplate coupled to the compressor housing. The compressor impeller defines an outermost impeller edge and has a maximum cross-sectional dimension at the outermost impeller edge. The method further includes guiding a portion of the intake gases flowing along the outermost impeller edge into the air foil bearing assembly via a cooling gas opening extending through the compressor backplate. The method may further include guiding a portion of the intake gases through a bearing housing of the air foil bearing assembly to cool the air foil bearing assembly.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
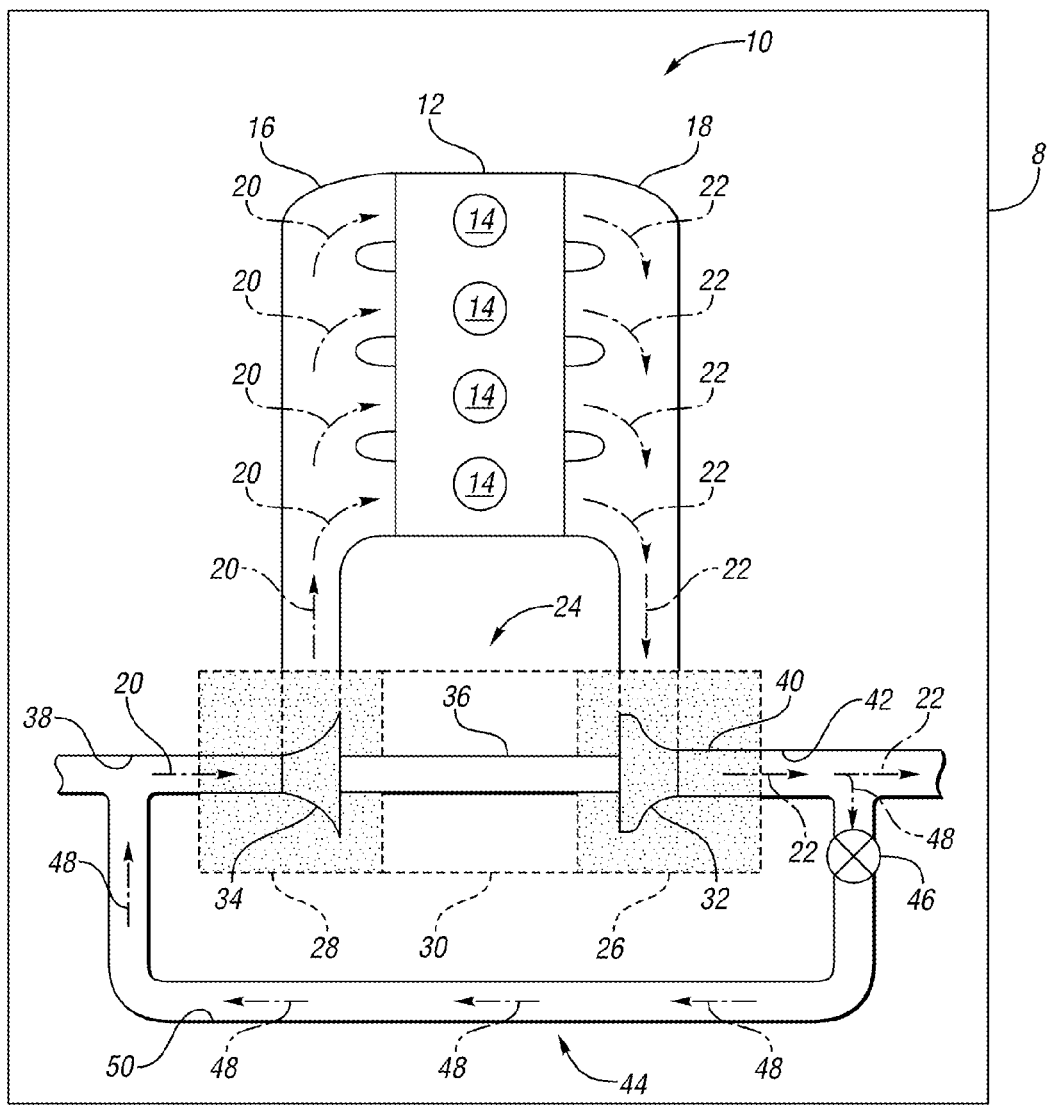
FIG. 1 is a schematic illustration of a vehicle including an internal combustion engine and a turbocharger assembly.

Referring to FIG. 1, a vehicle 8, such as a car, includes an internal combustion engine 10 configured to power a transmission (not shown). The internal combustion engine 10 may be a compression ignited or spark ignited type internal combustion engine. The internal combustion engine 10 includes an engine block 12 defining a plurality of cylinders 14. Although four cylinders 14 are shown in FIG. 1, the internal combustion engine 10 may include more or fewer cylinders 14. An intake manifold 16 and an exhaust manifold 18 are mounted to the internal combustion engine 10. The intake manifold 16 operates to communicate intake gases 20, such as air or recirculated exhaust gases, to the cylinders 14 of the internal combustion engine 10. The cylinders 14 at least partially define a variable volume combustion chamber operable to combust the intake gases 20 with a fuel (not shown). The products of combustion or exhaust gases 22 are expelled from the cylinders 14 into the exhaust manifold 18.

The internal combustion engine 10 further includes a turbocharger assembly 24. The turbocharger assembly 24 includes a turbine assembly 26, a compressor assembly 28, and a center housing 30. The turbine assembly 26 includes a turbine wheel 32 rotatable within the turbine assembly 26. Similarly, the compressor assembly 28 includes a compressor impeller 34 rotatable within the compressor assembly 28. The center housing 30 supports a shaft 36 operable to interconnect the turbine wheel 32 and the compressor impeller 34. As such, the turbine wheel 32 and compressor impeller 34 rotate in unison. The compressor assembly 28 is disposed in fluid communication with an inlet conduit 38 operable to introduce intake gases 20 to the turbocharger assembly 24. The compressor assembly 28 is also disposed in fluid communication with the intake manifold 16 to introduce intake gases 20 thereto. Additionally, the turbine assembly 26 is disposed in fluid communication with the exhaust manifold 18 to receive exhaust gases 22 therefrom. Exhaust gases 22 are communicated from an outlet 40 to an exhaust discharge conduit 42 for subsequent release to the atmosphere.

The internal combustion engine 10 includes an exhaust gas recirculation (EGR) system 44. The EGR system 44 includes a valve 46 operable to selectively and variably communicate a portion 48 of the exhaust gases 22 into a passage 50 for subsequent introduction to the inlet conduit 38. The portion 48 of the exhaust gases 22 may be introduced to the passage 50 either upstream or downstream of the turbine assembly 26. The EGR system 44 can be used to reduce certain emission constituents, such as oxides of nitrogen.

In operation of the internal combustion engine 10, exhaust gases 22 are expelled from the cylinders 14 into the exhaust manifold 18. The exhaust gases 22 are transferred into the turbine housing 52 where a portion of the energy contained within the exhaust gases 22 is utilized to spin or rotate the turbine wheel 32. The exhaust gases 22 are then communicated to the exhaust discharge conduit 42. Because the shaft 36 interconnects the compressor impeller 34 and the turbine wheel 32, rotating the turbine wheel 32 causes the compressor impeller 34 to spin or rotate. The rotation of the compressor impeller 34 causes the intake gases 20 to be inducted into the compressor assembly 28, where the intake gases 20 are pressurized and introduced to the intake manifold 16 for introduction to the cylinders 14. By increasing the pressure within the intake manifold 16, the density of the intake gases 20 is increased. As a consequence of this increase in density, a greater amount of fuel is oxidized and combusted within the cylinders 14, thereby increasing the peak pressure within the cylinders 14. As such, a greater amount of power may be produced from a turbocharged internal combustion engine compared to a naturally aspirated internal combustion engine of the same displacement.

Figure 3:
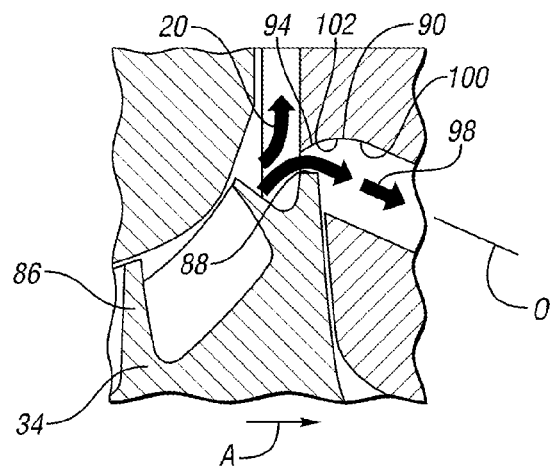
FIG. 3 is an enlarged schematic cross-sectional side view of a portion of the turbocharger assembly shown in FIG. 1, taken around section 3 of FIG. 2.
Figure 2:
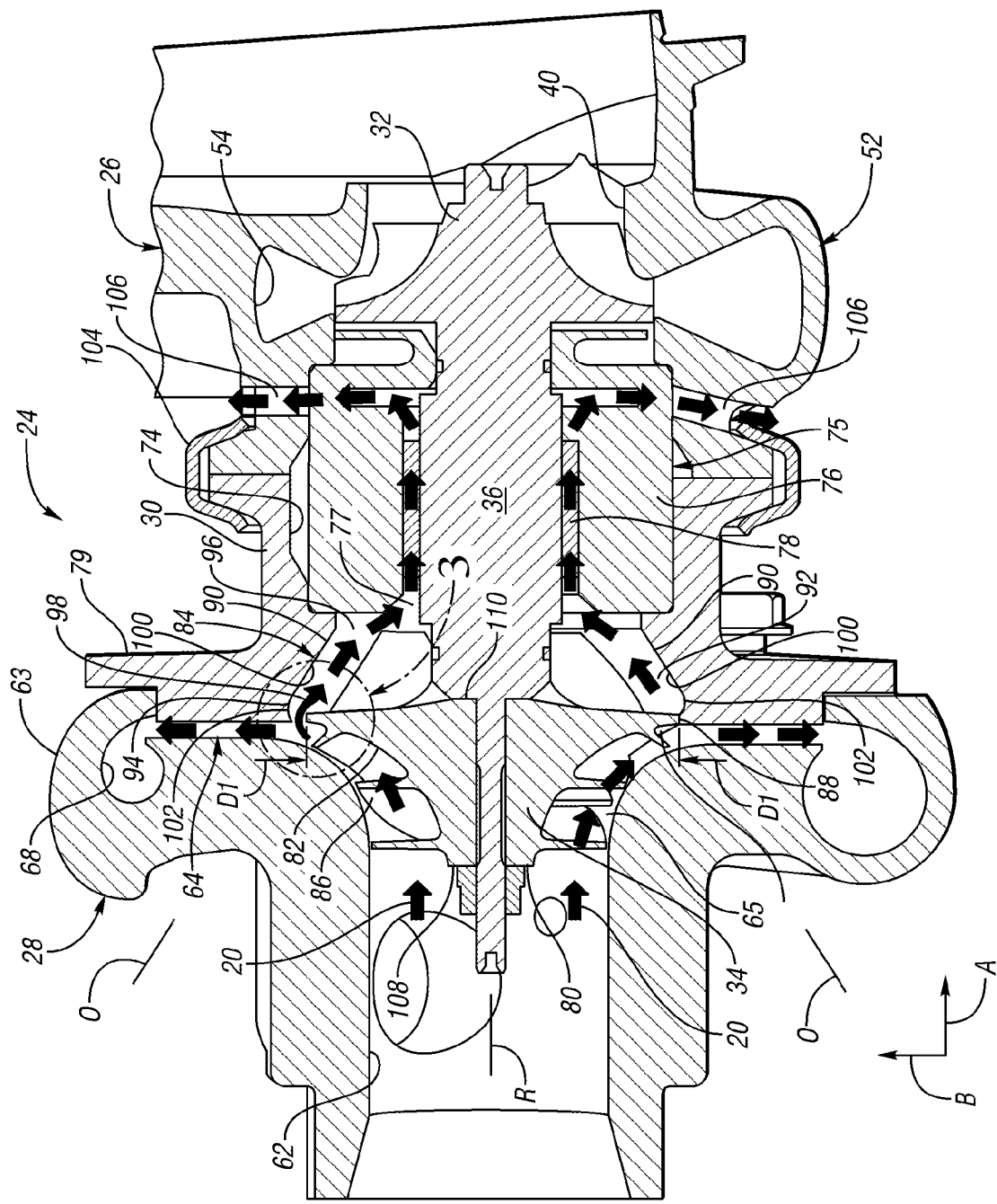
FIG. 2 is a schematic cross-sectional view side of the turbocharger assembly shown schematically in FIG. 1.

Referring to FIGS. 2 and 3, an exemplary embodiment of the turbocharger assembly 24 includes the turbine assembly 26, which in turn includes a turbine housing 52. The turbine housing 52 defines a turbine scroll or volute 54 operable to direct exhaust gases 22 radially inwardly toward the turbine wheel 32 to effect rotation thereof. The turbine assembly 26 may further include a variable geometry mechanism (not shown) operable to vary the flow pattern of the exhaust gases 22 (FIG. 1) from the turbine volute 54 to the turbine wheel 32. The flow of exhaust gases 22 (FIG. 1) along the turbine wheel 32 causes the turbine wheel 32 to rotate or spin. Because the shaft 36 is coupled to the turbine wheel 32, the rotation of the turbine wheel 32 causes the shaft 36 to rotate as well. The rotation of the shaft 36 in turn drives the rotation of the compressor impeller 34 disposed in the compressor assembly 28.

The compressor assembly 28 includes a compressor housing 63, which defines an inlet 62 operable to direct intake gases 20 axially toward the compressor impeller 34. The compressor housing 63 defines an inner compressor cavity 65 disposed in fluid communication with the inlet 62 and a compressor volute 68 operable to direct compressed intake gases 20 radially outward toward the intake manifold 16 (FIG. 1). The compressor impeller 34 is disposed in the compressor inner cavity 65 and includes an inducer portion 80, an exducer portion 82, and a plurality of compressor vanes 86 disposed along the inducer portion 80 and the exducer portion 82. The compressor impeller 34 includes a first impeller end 108 at the inducer portion 80 and a second impeller end 110 at the exducer portion 82. The first impeller end 108 is disposed farther from the turbine wheel 32 than the second impeller end 110.

Upon rotation of the compressor impeller 34, the inducer portion 80 inducts intake gases 20 into the compressor housing 63. Once the inlet gases 20 are inside the compressor housing 63, the compressor vanes 86 guide the flow of the inlet gases 20 from the inducer portion 80 toward the exducer portion 82. While the compressor impeller 34 rotates, the exducer portion 82 directs the intake gases 20 from the compressor impeller 34 to the compressor volute 68. The compressor volute 68 then directs the compressed intake gases 20 toward the intake manifold 16 (FIG. 1).

The compressor impeller 34 may have a substantially frusto-conical shape. As such, the compressor impeller 34 may have different cross-sectional dimensions or diameters along its length. In particular, the cross-sectional dimension of the compressor impeller 34 may increase in a first direction, which is indicated by arrow A, from the first impeller end 108 to the second impeller end 110. The exducer portion 82 includes an outermost impeller edge 88 defining a major or maximum impeller cross-sectional dimension or diameter D1. The maximum impeller cross-sectional dimension D1 refers to the largest cross-sectional dimension of the compressor impeller 34. The outermost impeller edge 88 may be disposed, for example, at or near the second impeller end 110. Therefore, the maximum impeller cross-sectional dimension D1 may refer, for example, to the diameter of the compressor impeller 34 at the second impeller end 110 as measured along a second direction, which is indicated by arrow B. The compressor assembly 28 may further include a diffuser section 64 operable to reduce the speed of the intake gases 20 and a variable geometry mechanism (not shown) operable to vary the flow pattern of the intake gases 20 from the compressor impeller 34 to the compressor volute 68 defined by the compressor housing 63.

The center housing 30 is connected between the turbine housing 52 and the compressor housing 63. The turbine housing 52 may be coupled to the center housing 30 with any suitable coupler 104 such as clamp. The center housing 30 defines an inner center cavity 74, and the shaft 36 is at least partly disposed in the inner center cavity 74. The center housing 30 may include a compressor backplate 79 juxtaposed to the compressor assembly 28. Thus, the compressor backplate 79 may be monolithically formed with the center housing 30. It is envisioned, however, that the compressor backplate 79 may not be part of the center housing 30. For instance, the compressor backplate 79 may be a discrete component coupled between the compressor housing 63 and the center housing 30. Further, the compressor backplate 79 may be monolithically formed with the compressor housing 63. Irrespective of its construction, the compressor backplate 79 should substantially cover the compressor impeller 34. Specifically, the compressor backplate 79 may substantially cover the second impeller end 110. Accordingly, the compressor backplate 79 may be disposed, for example, adjacent the second impeller end 110.

The turbocharger assembly 24 further includes a bearing assembly 75 at least partly disposed within the center housing 30. That is, at least a portion of the bearing assembly 75 may be disposed in the inner center cavity 74. The bearing assembly 75 may be an air foil bearing assembly or any other suitable bearing assembly. In the depicted embodiment, the bearing assembly 75 is an air foil bearing assembly and includes a bearing housing 76 at least partly disposed within the center housing 30. The bearing housing 76 defines an inner bearing cavity 77 configured, shaped, and sized to receive at least a portion of the shaft 36. Accordingly, the bearing housing 76 surrounds at least a portion of the shaft 36. The bearing assembly 75 further includes a compliant, spring-loaded foil journal lining 78 disposed within the bearing housing 76. Specifically, the lining 78 is disposed in the inner bearing cavity 77. When the shaft 36 turns at a relatively high speed, a gas (such as air) can flow between the shaft 36 and the lining 78, thereby forcing the lining 78 away from the shaft 36. The pressurized gas that separates the lining 78 and the shaft 36 acts as a lubricant, thereby minimizing wear on the shaft 36.

The shaft 36 is configured to rotate about a rotation axis R and may be elongated along the rotation axis R. As the rotational speed of the shaft 36 increases, more heat is generated in the bearing assembly 75. To decrease the temperature in the bearing assembly 75, the turbocharger assembly 24 includes a bearing cooling system 84 configured to supply cooling gases (such as a portion 98 of the intake gases 20) into the bearing assembly 75 to cool the bearing assembly 75. The bearing cooling system 84 includes one or more cooling gas conduits 90 operable to communicate the portion 98 of the intake gases 20 into the air bearing housing 76. To do so, the cooling gas conduits 90 fluidly couple the inner compressor cavity 65 with the inner bearing cavity 77. Consequently, the cooling gases (i.e., the portion 98 of the intake gases 20) can travel from the inner compressor cavity 65 into the inner bearing cavity 77 to cool the lining 78 and other parts of the bearing assembly 75. The portion 98 of the intake gases 20 (i.e., the cooling gases) may travel through a portion of the inner center cavity 74 to reach the inner bearing cavity 77.

The cooling gas conduits 90 may have similar or different configurations or constructs. For example, one of the cooling gas conduits 90 may define a cooling gas opening 92, which in turn is defined by the compressor backplate 79. The cooling gas opening 92 may extend through the compressor backplate 79 and is operable to direct the portion 98 of the intake gases 20 (i.e., the cooling gases) from the inner compressor cavity 65 toward the inner bearing cavity 77. As used herein, the term "opening" includes without limitation a hole, orifice, a channel, a groove, or any kind of structure or void capable of conveying gases from the inner compressor cavity 65 toward the inner bearing cavity 77. In the depicted embodiment, the compressor backplate 79 defines a plurality of openings 92 disposed in fluid communication with the inner compressor cavity 65 and the inner bearing cavity 77. Each cooling gas opening 92 may be elongated along a central opening axis O obliquely angled in relation to the rotation axis R. The compressor backplate 79 includes one or more inner backplate surfaces 100 each defining at least one cooling gas opening 92.

Each cooling gas opening 92 may be substantially cylindrical and includes a first end portion 94 and a second end portion 96 opposite the first end portion 94. The first end portion 94 is closer to the compressor impeller 34 than the second end portion 96. Specifically, the first end portion 94 may be disposed adjacent the outermost impeller edge 88 such that the portion 98 of the intake gases 20 exiting the exducer portion 82 can enter the cooling gas opening 92 while the remaining intake gases 20 enter the compressor volute 68. In operation, the cooling gases (i.e., the portion 98 of the intake gases 20) enter the cooling gas opening 92 via the first end portion 94 and then exit via the second end portion 96. The second end portion 96 may be disposed adjacent or near the bearing assembly 75 such that the cooling gases can enter the bearing housing 76.

At least part of the first end portion 94 of the cooling gas openings 92 may overlap the outermost impeller edge 88. Accordingly, at least part of the inner backplate surface 100 may overlap the outermost impeller edge 88. The inner backplate surface 100 may include a curved section 102 at the first end portion 94 to facilitate entry of the portion 98 of the intake gases 20 into the cooling gas opening 92. The curved section 102 takes advantage of the inertia of the intake gases 20 flowing along the compressor impeller 34 to facilitate entry of the portion 98 of the intake gases 20 into the cooling gas opening 92. As such, the curved section 102 is configured and shaped to facilitate entry of the portion 98 of the inlet gases 20 flowing along the outermost impeller edge 88 into the cooling gas opening 92. The shape of the curved section 102 may be designed to minimize the gases taken from compressor assembly 28 while providing sufficient gases to cool the bearing assembly 75. At least part of the curved section 102 may overlap the outermost impeller edge 88. As discussed above, once the portion 98 of the intake gases 20 enters the cooling gas opening 92, such portion 98 is referred to as cooling gases. The cooling gases (i.e., the portion 98 of the intake gases 20) flow through the cooling gas opening 92 and into the bearing housing 76 via the second end portion 96. As the cooling gases flow through the bearing housing 76, the cooling gases cool the lining 78, the bearing housing 76 and other parts of the bearing assembly 75. As the rotational speed of the shaft 36 increases, more heat is generated in the bearing assembly 75. Because the cooling gases originate from the compressor assembly 28, as the rotational speed of the shaft 36 increases, more cooling gases are supplied into the bearing assembly 75.

After the cooling gases flow through the bearing assembly 75, these cooling gases can exit the turbocharger assembly 24 through any suitable conduit for subsequent release to the atmosphere. In the depicted embodiment, the cooling gases can exit the turbocharger assembly 24 via one or more outlet conduits 106 defined by the turbine housing 52. The outlet conduits 106 may be in fluid communication with the outlet 40, discharge conduit 42, or both (see FIG. 1).

The present disclosure also relates to methods of cooling the air foil bearing assembly 75. This method may include compressing the inlet gas 20 using the compressor assembly 28. As discussed above, the compressor assembly 28 includes the compressor housing 63, the compressor impeller 34 located within a compressor housing 63, and the compressor backplate 79 coupled to the compressor housing 63. The method may further include guiding the portion 98 of the intake gases 20 flowing along the outermost impeller edge 88 into the bearing assembly 75 (such as an air foil bearing assembly) via a cooling gas opening 92 extending through the compressor backplate 79. Moreover, the method may further include guiding the portion 98 of the intake gases 20 through the bearing housing 76 of the bearing assembly 75 to cool the bearing assembly 75.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A turbocharger assembly comprising:
   a compressor assembly including a compressor impeller, the compressor impeller including an outermost impeller edge and having a maximum cross-sectional dimension at the outermost impeller edge;
   a turbine wheel;
   a shaft interconnecting the compressor impeller and the turbine wheel;
   a bearing assembly surrounding at least a portion of the shaft;
   a cooling gas conduit disposed in fluid communication with the compressor assembly and the bearing assembly, wherein at least a portion of the cooling gas conduit is disposed adjacent the outermost impeller edge such that the cooling gas conduit is configured to receive a portion of intake gases flowing along the outermost impeller edge and guide the portion of the intake gases toward the bearing assembly to cool the bearing assembly; and
   wherein the cooling gas conduit includes a first end portion and a second end portion, the first end portion is disposed adjacent the outermost impeller edge to facilitate entry of the portion of the intake gases into the cooling gas conduit, the first end portion includes a curved section configured to facilitate entry of the portion of the intake gases into the cooling gas conduit, and at least part of the first end portion overlaps the outermost impeller edge.

2. The turbocharger assembly of claim 1, wherein the compressor impeller defines a first impeller end and a second impeller end, and the first end portion is disposed adjacent the second impeller end such that the portion of the intake gases flows into the cooling gas conduit.

3. The turbocharger assembly of claim 1, further comprising a compressor backplate disposed adjacent the compressor impeller, wherein the cooling gas conduit is configured as a cooling gas opening extending through the compressor backplate.

4. The turbocharger assembly of claim 3, wherein the shaft is configured to rotate about a rotation axis, the cooling gas opening is elongated along an opening axis, and the opening axis is obliquely angled in relation to the rotation axis.

5. The turbocharger assembly of claim 3, further comprising a center housing coupled between the compressor assembly and the turbine wheel, wherein the compressor backplate is monolithically formed with the center housing.

6. The turbocharger assembly of claim 5, wherein the second end portion is disposed within the center housing.

7. The turbocharger assembly of claim 5, wherein the second end portion is disposed adjacent the bearing assembly such that the cooling gas conduit is configured to direct the portion of the intake gases into the bearing assembly.

8. A vehicle comprising:
   an engine including an intake manifold and an exhaust manifold; and
   a turbocharger assembly including:
   a compressor assembly disposed in fluid communication with the intake manifold and including a compressor impeller, the compressor impeller defining a first impeller end and a second impeller end;
   a turbine assembly disposed in fluid communication with the exhaust manifold and including a turbine wheel, the turbine wheel being closer to the second impeller end than to the first impeller end;
   a shaft interconnecting the compressor impeller and the turbine wheel;

an air foil bearing assembly surrounding at least a portion of the shaft;

a compressor backplate covering the second impeller end, the compressor backplate defining a plurality of cooling gas openings, each cooling gas opening extending through the compressor backplate and disposed in fluid communication with the compressor assembly and the air foil bearing assembly, wherein each cooling gas opening is configured to receive a portion of intake gases flowing along the compressor impeller and direct the portion of the intake gases toward the air foil bearing assembly to cool the air foil bearing assembly; and wherein the compressor impeller includes an outermost impeller edge and has a maximum cross-sectional dimension at the outermost impeller edge, at least part of each cooling gas opening is disposed adjacent the outermost impeller edge, the compressor backplate includes a plurality of inner backplate surfaces, each inner backplate surface defines at least one of the cooling gas openings, each inner backplate surface includes a curved section disposed adjacent the outermost impeller edge, and each curved section is configured to allow the portion of the intake gases to enter each cooling gas opening.

9. The vehicle of claim 8, wherein at least part of the curved section overlaps the outermost impeller edge.

10. The vehicle of claim 8, wherein at least one of the cooling gas openings is elongated along an opening axis, the shaft is configured to rotate about a rotation axis, and the opening axis is obliquely angled in relation to the rotation axis.

11. The vehicle of claim 8, further comprising a center housing coupled between the compressor assembly and the turbine assembly, wherein the compressor backplate is monolithically formed with the center housing.

12. The vehicle of claim 8, wherein at least one of the cooling gas openings is cylindrical.

13. A method of cooling an air foil bearing assembly comprising:

compressing intake gases using a compressor assembly including a compressor housing, a compressor impeller located within the compressor housing and coupled to a shaft, and a compressor backplate coupled to the compressor housing, the compressor impeller defining an outermost impeller edge and having a maximum cross-sectional dimension at the outermost impeller edge, wherein the shaft is configured to rotate about a rotation axis; and guiding a portion of the intake gases flowing along the outermost impeller edge into the air foil bearing assembly via a cooling gas opening extending through the compressor backplate, wherein the cooling gas opening is elongated along an opening axis, and the opening axis is obliquely angled relative to the rotation axis.

14. The method of claim 13, further comprising guiding the portion of the intake gases through a bearing housing of the air foil bearing assembly to cool the air foil bearing assembly.

* * * * *